(12) United States Patent
'T Lam et al.

(10) Patent No.: US 10,173,830 B2
(45) Date of Patent: Jan. 8, 2019

(54) MEDICATION DISPENSING CONTAINER

(71) Applicant: VMI Holland B.V., Epe (NL)

(72) Inventors: Henri 'T Lam, Epe (NL); Kees Jochemsen, Epe (NL)

(73) Assignee: VMI HOLLAND B.V., Epe (NL)

( * ) Notice: Subject to any disclaimer, the term of this patent is extended or adjusted under 35 U.S.C. 154(b) by 496 days.

(21) Appl. No.: 14/783,876

(22) PCT Filed: Apr. 2, 2014

(86) PCT No.: PCT/NL2014/050200
§ 371 (c)(1),
(2) Date: Oct. 12, 2015

(87) PCT Pub. No.: WO2014/171818
PCT Pub. Date: Oct. 23, 2014

(65) Prior Publication Data
US 2016/0068328 A1    Mar. 10, 2016

(30) Foreign Application Priority Data

Apr. 19, 2013   (NL) .................................... 2010673

(51) Int. Cl.
*B65D 83/04*   (2006.01)
*G07F 17/00*   (2006.01)
(Continued)

(52) U.S. Cl.
CPC .......... *B65D 83/0409* (2013.01); *B65B 5/068* (2013.01); *G01F 23/292* (2013.01); *G07F 17/0092* (2013.01)

(58) Field of Classification Search
CPC .. B65B 1/06; B65B 1/30; B65B 1/103; B65B 35/08; B65B 35/12; B65B 35/32;
(Continued)

(56) References Cited

U.S. PATENT DOCUMENTS 4,573,606 A * 3/1986 Lewis ................... A61J 7/0481
221/15
4,695,954 A * 9/1987 Rose ..................... A61J 7/0481
221/15
(Continued)

FOREIGN PATENT DOCUMENTS

CN        102673934       9/2012
EP         2345399        7/2011
(Continued)

OTHER PUBLICATIONS

Notice of Allowance issued in Korean Patent Application No. 10-2015-7017505 dated May 24, 2017.
(Continued)

*Primary Examiner* — Hemant M Desai
*Assistant Examiner* — Valentin Neacsu
(74) *Attorney, Agent, or Firm* — Dann, Dorfman, Herrell and Skillman; Stephen Eland (57) ABSTRACT

The invention relates to a medication dispensing container for holding medications, which container is provided with a dispensing mechanism comprising: an arranging body comprising passageways, each for accommodating a number of medications in a single row, a first wall member with an output opening arranged below said arranging body, said arranging body is arranged to subsequently align one of said passageways with said output opening, a separating member which blocks a passageway when aligned with the output opening, a storage body comprising waiting chambers arranged below said first wall member, each waiting chamber is arranged for receiving the medication(s) from one passageway, a second wall member with an outlet opening arranged below said storage body, said storage body is arranged to subsequently align one of said waiting chambers with said outlet opening, and a detection arrangement for the
(Continued)

detection whether or not one of said waiting chambers is filled.

35 Claims, 7 Drawing Sheets

(51) Int. Cl.
  *B65B 5/06* (2006.01)
  *G01F 23/292* (2006.01)
(58) Field of Classification Search
  CPC ......... B65B 35/54; B65B 65/08; B65B 37/02; B65B 39/002; B65B 57/10; B65B 57/20; G07F 11/44; G07F 11/54; G07F 11/62; G07F 11/10; G07F 11/24; A61J 7/0084; A61J 7/0076
  USPC ... 53/443, 450, 455, 154, 550, 562, 55, 493, 53/498, 500, 501, 167; 221/12–14, 221/82–83, 263–265, 277
  See application file for complete search history.

(56) References Cited

U.S. PATENT DOCUMENTS

| | | | | |
|---|---|---|---|---|
| 5,765,606 A * | 6/1998 | Takemasa | ................ | G07F 11/62 141/104 |
| 5,865,342 A * | 2/1999 | Ito | ............................ | G07F 11/44 198/691 |
| 6,216,910 B1 * | 4/2001 | Numerick | ................ | G07F 11/52 221/7 |
| 6,394,308 B1 * | 5/2002 | Yuyama | ............. | B65G 47/1457 221/265 |
| 6,471,087 B1 * | 10/2002 | Shusterman | ....... | A61B 5/02055 221/2 |
| 7,048,141 B2 * | 5/2006 | Abdulhay | ................ | G07F 11/10 221/15 |
| 2004/0261357 A1 * | 12/2004 | Takahashi | ................ | B65B 5/103 53/247 |
| 2005/0162403 A1 * | 7/2005 | Kim | ........................ | B65B 5/103 345/173 |
| 2005/0230413 A1 | 10/2005 | Kim | | |
| 2008/0099499 A1 | 5/2008 | Kim | | |
| 2009/0112361 A1 * | 4/2009 | Berg | ...................... | A61J 7/0084 700/231 |

FOREIGN PATENT DOCUMENTS

| | | |
|---|---|---|
| JP | 2005247355 | 9/2005 |
| JP | 2005289506 | 10/2005 |
| KR | 1020100135973 | 4/2011 |
| TW | 201215386 | 4/2012 |
| WO | 2011024852 | 3/2011 |

OTHER PUBLICATIONS

International Preliminary Report issued in International Patent Application No. PCT/NL14/50200 dated Oct. 29, 2015.
Official Action issued in Japanese Application No. 2016-508918 dated Feb. 23, 2018 and translation.
Search Report issued in Taiwanese Application No. 103113743 dated Aug. 10, 2017.

* cited by examiner

MEDICATION DISPENSING CONTAINER

BACKGROUND

The invention relates to a medication dispensing containers for holding solid medications, in particular pills, tablets or capsules, and which container is provided with a dispensing mechanism which is arranged for selectively dispensing an amount of said solid medications from an outlet at the bottom side of said container. The invention further relates to a system which accommodates a series of medication dispensing containers, which system is arranged for selectively dispensing an amount of said solid medications from one or more medication dispensing containers and for packing said dispensed amount. The invention further relates to a method for dispensing an amount of said solid medications from said container.

Such a device and method is, for example, disclosed in the U.S. Pat. No. 5,865,342. This US Patent describes a dispensing drum which is arranged at a bottom side of a tablet case, and which lets the medications fall through an outlet from the tablet case as it rotates. The dispensing drum is equipped with a plurality of grooves into which the medications from the tablet case are fed and which let the medication fall there from when they are aligned with the outlet. The dispensing drum is provided with a separating member in such a manner that it juts out into or over the groove aligned with the outlet and is capable of securely retaining a medication thereon.

A plurality of such medication dispensing containers are used in a system which is arranged for selectively discharging an amount of said medications from one or more medication dispensing containers and for packing said discharged amount. Said system is provided with an array of container positions arranged adjacently in a plane, each of said array of container positions is provided with a holder for one of said medical dispensing containers and with a through opening for passing discharged medication there through. At the through opening a photo sensor is arranged for detecting and counting the discharged medication.

A disadvantage of the known device is, that a missing medication, for example when the tablet case is empty or when a medication is not discharged because it is jammed in the groove, is detected at the moment said medication should fall through the outlet. This will bring the system to a standstill, until a falling medication is detected.

It is an object of the present invention to provide an improved medication dispensing container, a system and a method which at least substantially reduces the occurrence of a missing medication, and allows a further reduction of the time required for a series of packing operations.

SUMMARY OF THE INVENTION

According to a first aspect, the invention pertains to a medication dispensing container for holding solid medications, in particular pills, tablets or capsules, as defined in claim 1. The medication dispensing container of the invention is provided with a dispensing mechanism which is arranged for selectively dispensing an amount of said solid medications from an outlet opening at the bottom side of said container, wherein said dispensing mechanism comprises:

an arranging body comprising a plurality of passageways, wherein each passageway is arranged for accommodating one of said solid medications or more of said solid medications in a single row, a first wall member arranged below said arranging body and provided with an output opening, wherein the first wall member and the arranging body are movable with respect to each other in order to subsequently align one of said plurality of passageways with said output opening, a separating member which extends out into or over a passageway which is aligned with the output opening, a storage body arranged below said first wall member, said storage body comprising a plurality of waiting chambers, each waiting chamber is arranged for receiving the solid medication(s) from one passageway when said passageway, said output opening and said waiting chamber are in alignment, and for accommodating said solid medication(s), a second wall member arranged below said storage body and provided with the outlet opening, wherein the second wall member and the storage body are movable with respect to each other in order to subsequently align one of said plurality of waiting chambers with said outlet opening, and a detection arrangement for at least facilitating the detection whether or not one or more of said waiting chambers are filled with the solid medication(s).

In use, the container, above the dispensing mechanism, is filled with solid medications or medicaments of a single sort, which solid medications rest on top of the arranging body. The solid medications may slide into the passageways which are adapted to the dimensions of the individual solid medications for accommodating two or more of said solid medications in a single row. When one of said passageways aligns with the output opening of the first wall member, one individual solid medication may fall through the output opening, while the other solid medications are stopped by the separating member which extends out into or over said passageway which is aligned with the output opening.

According to the invention, the solid medication which falls through the output opening, falls into a waiting chamber of the storage body. Due to the presence of the detection arrangement, it can be established whether or not said waiting chamber is filled with the solid medication. In case this particular medication dispensing container needs to dispense a solid medication, a filled waiting chamber and the outlet opening can directly be brought into alignment, wherein the solid medication from the waiting chamber falls through the outlet opening.

The improved medication dispensing container of the invention can establish beforehand, thus before the medication dispensing container is activated to dispense a solid medication, whether or not a waiting chamber is filled, and therefore can directly bring a filled waiting chamber in alignment with the outlet opening when a medication needs to be dispensed by said container. The occurrence of a missing medication, and a corresponding standstill of a system which accommodates a series of medication dispensing containers, which system is arranged for selectively dispensing an amount of said solid medications from one or more medication dispensing containers and for packing said dispensed amount, can thus at least substantially be reduced or even circumvented.

In addition, when substantially all passageways of said plurality of passageways have been brought into alignment with the output opening, and it is established by the detection arrangement that none of said waiting chambers is filled with the solid medication, the improved medication dispensing container of the invention can establish beforehand, thus before the medication dispensing container is activated to dispense a solid medication, that it is empty and needs to be refilled or replaced.

In an embodiment, the detection arrangement comprises a passage for a light beam, which passage crosses the output opening, and preferably is arranged between the first wall member and the storage body. When a solid medication falls through the output opening, it traverses said passage and can temporally block a light beam which is directed through said passage. The temporally blocking of said light beam is thus an indication that a solid medication has fallen into the waiting chamber below the output opening, and that this waiting chamber is filled.

In an embodiment, the container is provided with at least one opening which connects to the passage for positioning a light source and/or a detector in alignment with said passage. Thus the light source and/or the detector can be introduces in the container via the opening and thus do not need to be part of the container. Preferably the medication dispensing container of the invention has no active components, such as a light source and/or a detector.

In an embodiment, the output opening is arranged out of alignment with the outlet opening. In an embodiment, the output opening is shifted with respect to the outlet opening over a distance equal to or larger than a size of a waiting chamber. Preferably, the outlet opening is shifted one waiting chamber downstream of the output opening. Thus, when moving the storage body with respect to the second wall member over a distance of substantially one waiting chamber, the particular waiting chamber that is in alignment with the output opening is subsequently moved into alignment with the outlet opening.

In an embodiment, the first and second wall members are stationary arranged in said container.

In an embodiment, the arranging body and the storage body are cylindrical in shape, wherein a central axis of the storage body is substantially in line with the central axis of the arranging body. The arranging body and the storage body are rotatable arranged in the medical dispensing container so as to be rotatable around their central axis. On the one hand, the rotation of the arranging body assists in moving the solid medications to slide into the passageways, and provides subsequent alignment of the passageways with the output opening. On the other hand, the rotation of the storage body provides subsequent alignment of the waiting chambers with the output opening for receiving the solid medication(s), and subsequent alignment of the waiting chambers with the outlet opening for dispensing the solid medication(s) out of the medication dispensing container.

In an embodiment, the arranging body and the storage body are rotation-fixedly connected to each other. In this case only one drive unit is required for driving the rotation of both the arranging body and the storage body.

In an embodiment, the arranging body and/or the storage body are provided with a coupling member for coupling to an external driver for moving said arranging body and/or said storage body with respect to said container. Thus the driver for moving the arranging body and/or the storage body does not need to be part of the container. Preferably the medication dispensing container of the invention has no active components, such as driver for rotating the arranging body and/or the storage body.

In an embodiment, the cross-sectional area of one of said plurality of waiting chambers, at least in a plane substantially parallel to the first wall member, is larger then the cross-sectional area of one of said passageways. In the devices of the prior art, the medications are discharged from the passageway which is brought into alignment with the outlet opening. As the passageways are adapted to the dimensions of the individual solid medications in order accommodating one of said solid medications or two or more of said solid medications in a single row, these passageways are relatively narrow which may cause a jamming of the solid medication in said passageways, as a result of this jamming said medication is not discharged. By using a larger waiting chamber, preferably a slightly larger waiting chamber, at least with respect to the dimensions of the individual solid medications, jamming of the solid medication and not discharging the medication as in the prior art is less likely to occur or substantially does not occur in the medication dispensing container of the invention.

In an embodiment, the cross-sectional area of one of said plurality of waiting chambers, at least in a plane substantially parallel to the second wall member, and the outlet opening are substantially congruent. Using an outlet which is substantially the same size and the same shape as the waiting chamber facilitates a reliable dispensing of the medication from the waiting chamber, in particular, when the waiting chamber and this outlet come into alignment with each other during the dispensing of the medication.

In an embodiment, the container comprises a stop mechanism for holding the storage body in a substantially fixed position in the container. The stop mechanism is arranged for preventing a movement of the storage body and thus preventing a dispense of the medication, at least when transporting the container for example from a supply station onto a system which accommodates a series of medication dispensing containers for selectively dispensing an amount of said solid medications from one or more medication dispensing containers and for packing said dispensed amount, and/or vice versa.

In an embodiment, the stop mechanism comprises a stop ring and a stop spring. In an embodiment, the stop ring is fixedly arranged on the storage body, and wherein the stop spring is fixedly arranged on an inside part of the container facing said stop ring. The stop ring is preferably provided with a series of teeth which are arranged facing said stop spring. The stop spring preferably is a flexible stop spring which abuts the stop ring and reaches in a gap in between two adjacent teeth for holding the storage body is a substantially fixed position. In an embodiment, the container is provided with at least one de-activating opening which connects to the stop mechanism. The stop mechanism, in particular the stop spring thereof, is biased in an active position to hold the storage body in the substantially fixed position. Via the de-activating opening, a de-activating member can be inserted in the medication dispensing container, which de-activating member unlocks and de-activates said stop mechanism. With the stop mechanism de-activated, the storage body can be driven in order to dispense a medication from the container.

In an embodiment, the container comprises a grip which is arranged at the top of the container, and which is shaped to seize and move the container manually on the one hand, and by robot on the other. Said containers are used in a system which accommodates a series of medication dispensing containers for selectively dispensing an amount of said solid medications from one or more medication dispensing containers and for packing said dispensed amount. The containers according to this embodiment, can be placed in the system or removed from the system manually or by means of a robot or robot arm, and thus can be used in a system with or a system without a robot or robot arm.

In some systems, the containers need to be placed in the system with a substantially fixed orientation. In an embodiment, the shape of the grip comprises a bilateral symmetry in only one sagittal plane.

In an embodiment, the shape of the grip provides a preferential direction of the container, in particular in said sagittal plane. Due to the shape of the grip, the container can be picked up substantially in one way by hand or by robot.

In an embodiment, the container comprises a filling opening at the top of the container, and a cover for substantially closing said filling opening, wherein the cover comprises said grip. The grip is thus arranged substantially on top of the container and is readily available in order to be seized manually or by a robot or robot arm.

In an embodiment, the container comprises with a chamber for containing a drying substance, which chamber is arranged in fluid communication with the inside of the container, and which chamber is arranged in said grip.

In an embodiment, the container comprises a display chamber for holding an example of the solid medication, wherein the display chamber is provided with a substantially transparent wall at a side facing the outside of the container, and which display chamber is arranged in said grip.

According to a second aspect, the invention pertains to a system which accommodates a series of medication dispensing containers according to the description above, which system is arranged for selectively dispensing an amount of said solid medications from one or more medication dispensing containers and for packing said dispensed amount, as defined in claim 20. The system of the invention comprises:

a holding device provided with an array of container positions arranged adjacently in a plane, wherein the holding device at each of said array of container positions is provided with a holder for one of said medication dispensing containers and with a through opening for passing discharged solid medications there through, a collection frame arranged below the holding device, wherein the collection frame and the holding device are movable with respect to each other, wherein said collection frame is provided with a series of collection trays, said trays have an elongated shape with a longitudinal direction which extends substantially parallel to said plane and over a length of at least two of said through openings, wherein said trays comprises a receiving opening at a side facing said holding device for capturing said discharged solid medications and each comprises an output, a packing unit arranged below the collection frame for collecting the captured solid medications from the output of a tray and packing said solid medications, and a controller for controlling the working of said system and the medication dispensing containers arranged on said holding device.

In an embodiment, at least one container position comprises one or more positioning projections, wherein the positioning projections provide a fixed orientation of a medical dispensing container when arranged at said at least one container position.

In an embodiment, said positioning projections comprises a position column which projects out of the plane of the holding device, in a direction substantially perpendicular to said plane.

In an embodiment, the medical dispensing container comprises openings at the bottom side for accommodating said positioning projections, wherein the positioning projections and the openings provides a fixed orientation of a medical dispensing container when arranged at said at least one container position.

In an embodiment, one or more of said positioning projections comprises interface connections for connecting the controller to a medication dispensing container arranged on said positioning projections with interface connections.

In an embodiment, one or more of said positioning projections comprises a first light source and/or a first detector, wherein the first detector is connected to the controller, wherein the first light source and/or first detector are arranged for aligning with a detection arrangement in a medication dispensing container arranged on said positioning projection(s) with first light source and/or first detector, preferably when said positioning projection(s) with first light source and/or first detector is arranged in said at least one detector opening. In an embodiment, the first detector is connected to the controller.

In an embodiment, at least one of said positioning projections comprises a de-activating member, wherein the de-activating member is arranged for de-activating or unlocking said stop mechanism in a medication dispensing container arranged on said positioning projection(s) with the de-activating member, preferably when said positioning projection(s) with the de-activating member is arranged in said at least one de-activating opening.

In an embodiment, at least one container position comprises a delivery detection arrangement for detecting the dispensing of a medication from a medical dispensing container arranged at said at least one container position.

In an embodiment, said delivery detection arrangement comprises a second light source for emitting a light beam which crosses the outlet opening the medical dispensing container arranged at said at least one container position, and a second detector arranged in the light beam path of the light beam, in particular at a position after the light beam has crossed the outlet opening at least once, wherein the second detector is connected to the controller.

In an embodiment, one or more of said container positions comprises a code reader for reading an identification code of a medication dispensing container arranged on said container position, wherein said code reader is connected to the controller.

In an embodiment, one or more of said container positions comprises an indicator light for illuminating a medication dispensing container arranged on said container position, wherein said indicator light is connected to the controller.

In an embodiment, said indicator light is arranged to emit light upwards for illuminating a lateral surface of said medication dispensing container.

In an embodiment, one or more of said medication dispensing containers comprises a guiding arrangement for guiding light which originates form the indicator light towards the top side of the medical dispensing container, wherein the guiding arrangement preferably is arranged for illuminating the cover of the medication dispensing container.

In an embodiment, the output of a collection tray comprises a tube part comprising an output opening and a shutter wherein the shutter is movable between a closing position for closing said output opening and an opening position for opening said output opening, wherein said shutter in the closing position is arranged at a sharp angle with a horizontal plane.

According to a third aspect, the invention pertains to a method for dispensing solid medications, in particular pills, tablets or capsules, from a container, which container is provided with a dispensing mechanism which is arranged for selectively dispensing an amount of said solid medications from an outlet opening at the bottom side of said container, wherein said method comprises the steps of:

accommodating one of said solid medications or more of said solid medications in a single row, in one of a plurality of passageways of an arranging body, moving said arranging body with respect to a first wall member arranged below said arranging body and provided with an output opening, to align one of said plurality of passageways with said output opening, wherein a separating member which extends out into or over said one of said plurality of passageways substantially blocks said one of said plurality of passageways above a lower most solid medication in said one of said plurality of passageways, wherein said lower most solid medication falls through said output opening into one of a plurality of waiting chambers of a storage body which is arranged below said first wall member, wherein a filling of said one of a plurality of waiting chambers is detected by the use of a detection arrangement for at least facilitating the detection whether or not one or more of said waiting chambers are filled with the solid medication(s), moving said storage body with respect to a second wall member arranged below said storage body and provided with an outlet opening, to align one of said plurality of waiting chambers with said outlet opening, wherein the solid medication(s) in said one of said plurality of waiting chambers falls through said outlet opening and is dispensed out of the container.

In an embodiment, said container is a medication dispensing container as described above or an embodiment of said medication dispensing container as described above.

In an embodiment, said method is performed in a system as described above or an embodiment of said system as described above.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of exemplary embodiments of the invention as shown in the attached drawings, in which.

DETAILED DESCRIPTION OF THE INVENTION

Figure 1:
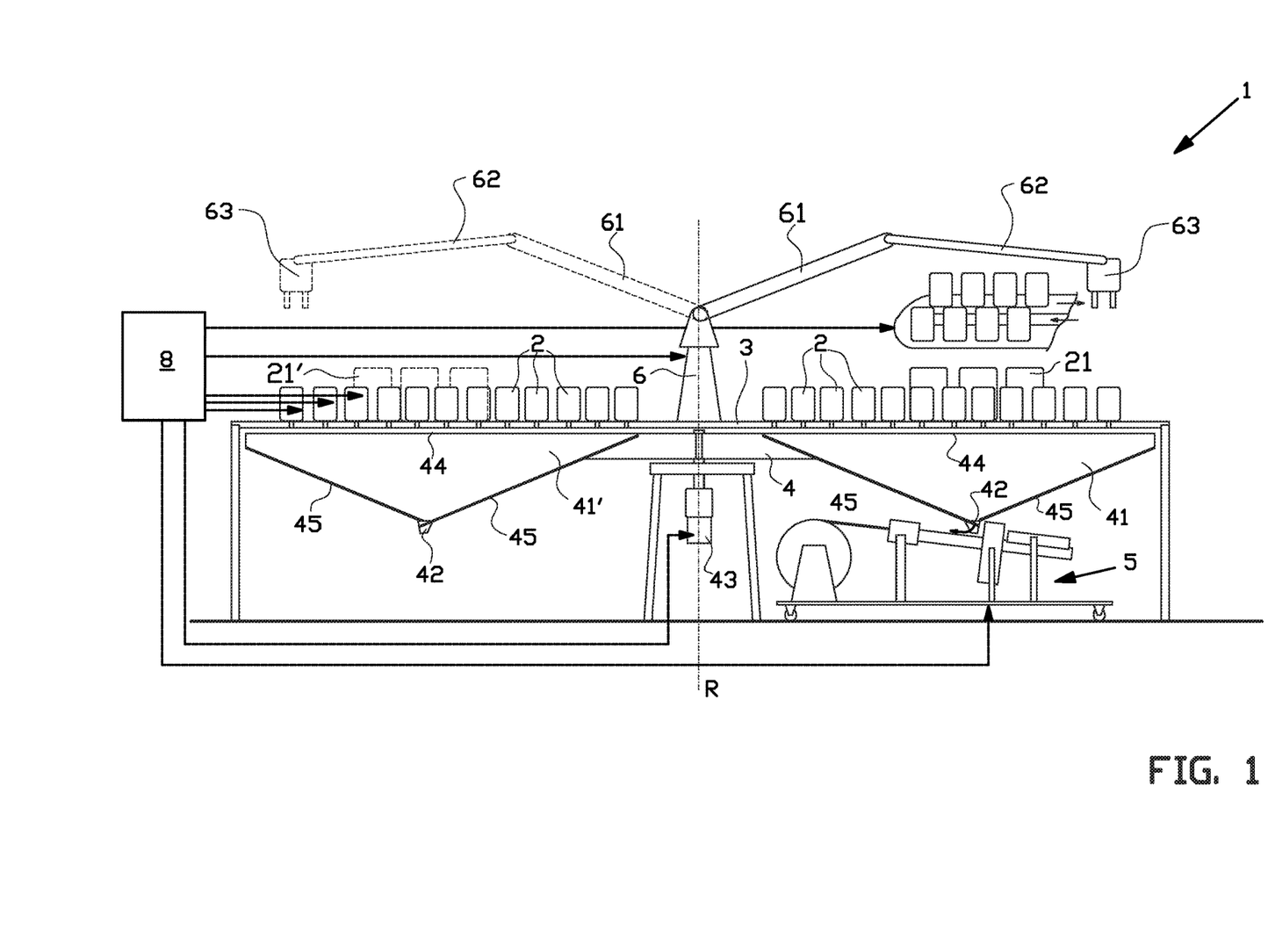
FIG. 1 shows a schematic cross section of a system which accommodates a series of medication dispensing containers for selectively dispensing an amount of said solid medications from one or more medication dispensing containers and for packing said dispensed amount.
Figure 2:
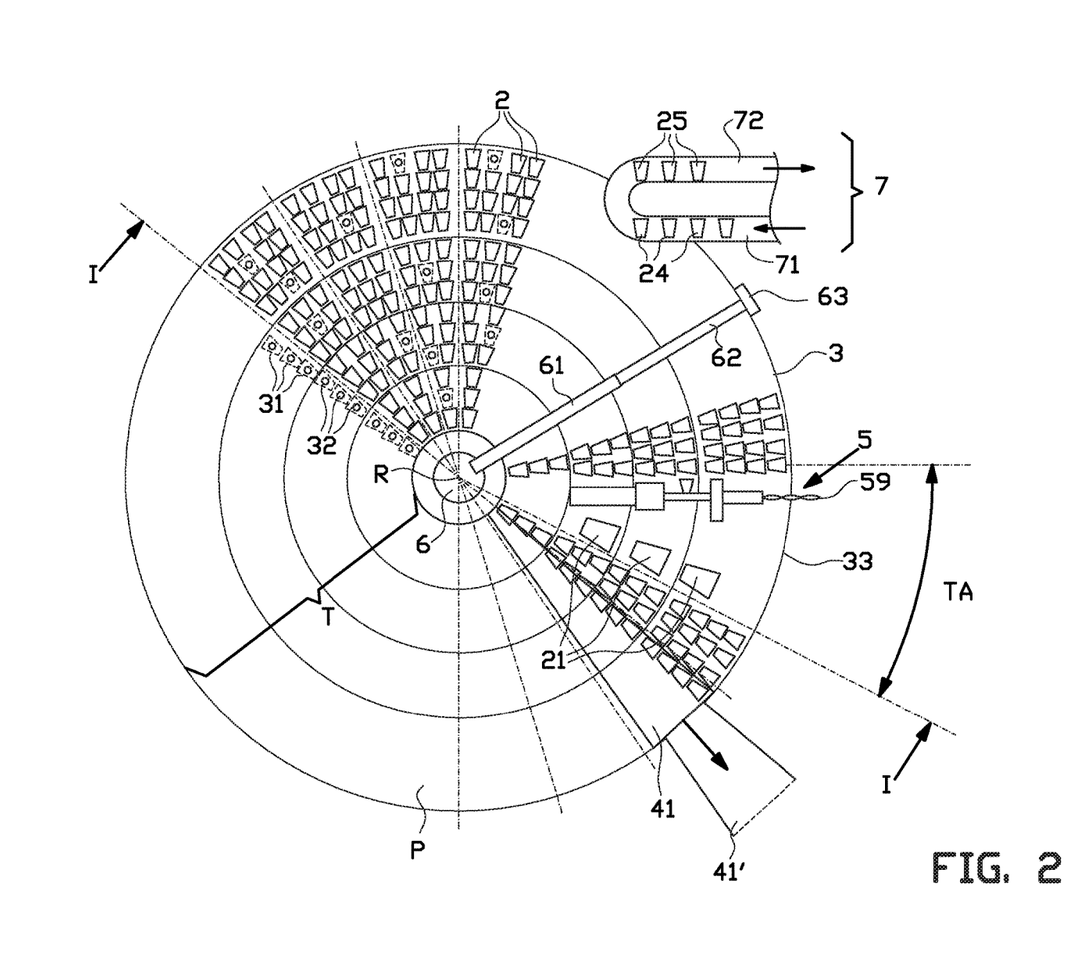
FIG. 2 shows a schematic top view of the holding device of the embodiment of FIG. 1.

FIGS. 1 and 2 show a system which accommodates a series of medication dispensing containers for selectively dispensing an amount of said solid medications from one or more medication dispensing containers and for packing said dispensed amount embodiment of the invention. The system 1 accommodates a series of dispensing containers 2, 21 arranged for selectively discharging an amount of solid medications, such as pills, tablets or capsules, from one or more dispensing containers 2, 21 for packing. Said system 1 comprises a holding device 3 provided with an array of container positions 31 (see FIG. 2) arranged adjacently in a plane P, a collection frame 4 arranged below the holding device 3 comprising a series of collection trays 41, 41' for capturing discharged solid medications from said dispensing containers 2, 21 and each collection tray 41 comprises an output 42, and a packing unit 5 arranged below the collection frame 4 for collecting the captured solid medications from the output opening 42 of a tray 41 and packing said solid medications.

The holding device 3 in this example is provided with a holder at each of said array of container positions 31 for holding one of said dispensing containers 2, 21. In addition, the holding device 3, and in particular the table, is provided with through openings 32 for passing discharged solid medications there through. As schematically indicated in FIG. 2, each container position 31 is provided with a corresponding through opening 32. FIG. 1 is a schematic cross section along the line I-I of FIG. 2.

Below the holding device 3, a collection frame 4 is arranged. The collection frame 4 and the holding device 3 are movable with respect to each other. In this example, the holding device 3 is arranged for substantially stationary holding the series of dispensing containers 2, 21. In particular, the dispensing containers 2, 21 are arranged stationary in the device 1, and the collection frame 4 is moved underneath these stationary dispensing containers 2, 21. The collection frame 4 is rotatable around a rotation axis R, wherein the rotation axis R extends substantially perpendicular to said plane P. The rotation of the collection frame 4 is driven by a motor 43.

The collection frame 4 is provided with a series of collection trays 41, 41', also denoted as collection hoppers, which are arranged around the rotation axis R. Said trays 41, 41' have an elongated shape with a longitudinal direction which extends substantially parallel to said plane P and over a length of a plurality of said through openings 32. Each one of said trays 41 comprises a receiving opening 44 at a side facing said holding device 3 for capturing said discharged solid medications. The trays 41 are substantially open at the upper side thereof, which open upper side defines the receiving opening 44 of the tray. As shown in FIG. 1, the open upper side extends substantially parallel to said plane P. The longitudinal direction of said trays 41 is arranged substantially radially with respect to said rotation axis R. By rotating the collection frame 4, the collection trays 41, 41' move underneath the holding device 3 and the series of dispensing containers 2, 21 arranged at the container positions 31 thereof. Each one of said collection trays 41, 41' can capture and accumulate one or more of the solid medications which are selectively discharged from one or more dispensing containers 2, 21 arranged in a substantially circular path above said collection trays 41, 41' as shown in FIG. 2.

As shown in FIG. 1, said trays 41, 41' extend from a position near the rotation axis R to an edge 33 of said holding device 3. Each one of the collection trays 41, 41' is able to collect one or more of the solid medications from substantially any one or from any combination of the dispensing containers 2, 21 which are arranged in said circular area T. As shown in FIG. 1, each one of said trays 41, 41' comprises a bottom surface 45 which is arranged to slope down to said output 42. Said output 42 is provided with a closing member which is movable into a first position for closing the output 42 and movable into a second position for allowing said solid medications to move out of the tray 41, as will be discussed in more detail below.

Below the collection frame 4, a packing unit 5 is arranged for collecting the captured solid medications from the output 42 of a tray 41 and packing said solid medications. The packing unit 5 is arranged at a stationary position in the system 1, underneath the movable collection trays 41. When the output opening 42 of the tray 41 aligns with the stationary position of the packing unit 5, the closing member is moved to the second position which allows the solid medications in the tray 41 to move through the output opening 42 into the packing unit 5. The packing unit 5 is arranged for packing the solid medications from each one of said trays 41, preferably in individual pockets of a foil 59.

The system 1 may also comprise a supply member 71 for supplying one or more new and/or full dispensing containers 24 to the system 1, and a manipulator system 6 to transport at least one of said new and/or full dispensing containers 24 from the supply member 71 onto one of said container positions 31 on the holding device 3. In addition, a discharge member 72 may be provided for removing one or more dispensing containers 25, in particular empty dispensing containers, from the holding device 3.

The manipulator 6 comprises a robotic arm 61, 62, which is arranged on said holding device 3. As shown in FIG. 1, the robotic arm 6 is arranged on said holding device 3 at or near the rotation axis R of the collection frame 4. By arranging the robotic arm 61, 62 centrally on the holding device 3, a gripper 63 for picking up one or more dispensing containers is arranged to reach at least each one of the container positions 31 on the holding device 3, and preferably also the supply member 71 and the discharge member 72.

The control system 8 provides control commands to the system 1, in particular to the output 42 of the trays 41, to the motor 43, to the packing unit 5, to the manipulator 6 and/or to the supply member 71 and the discharge member 72 as schematically shown in FIG. 1. In addition the control system 8 directly or indirectly provides control commands to the dispensing containers 2, 21, to discharge a prescribed amount of medicament from one or more of said dispensing containers 2, 21, into a particular collection tray 41. The control system 8 selects the specific dispensing container 2, 21 in accordance with the prescribed type of medicament, by using the information stored in a memory of said control system 8.

Figure 3:
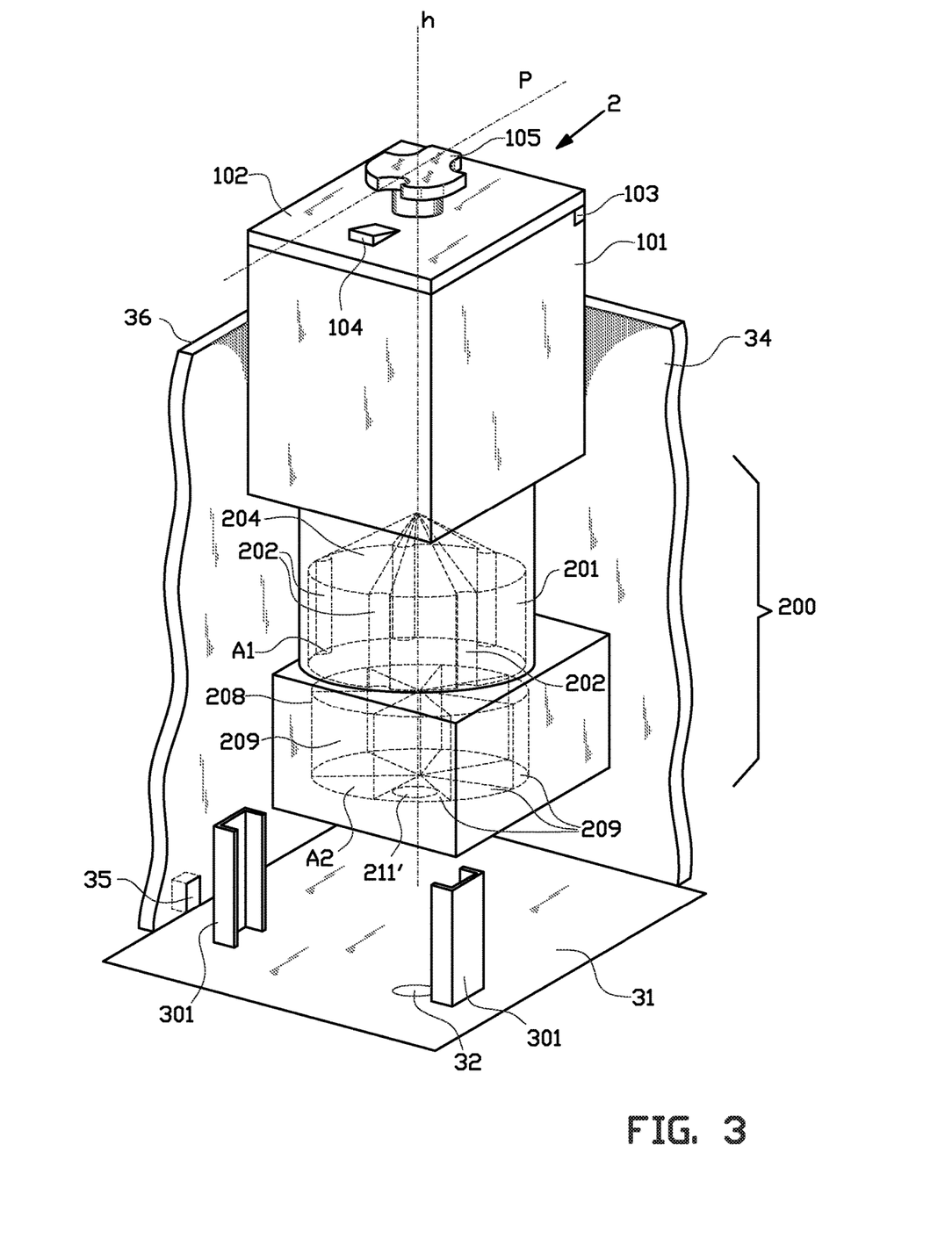
FIG. 3 shows a schematic view of a medication dispensing container.

FIG. 3 shows an example of a medical dispensing container 2 according to the invention. The container 2 comprises a supply chamber 101 with a lid or cover 102 on top. The cover 102 is connected to the supply chamber 101 by means of a hinge 103. Thus the cover 102 can swing around the hinge 103 for opening the top of the container 2 to gain access to a filling opening at the top of the container, for refilling the supply chamber 101. In the closed position as shown in FIG. 3, the cover 102 substantially closes the filling opening. The cover 102 is securable in the closed position by means of a cover locking catch 104.

Figure 6:
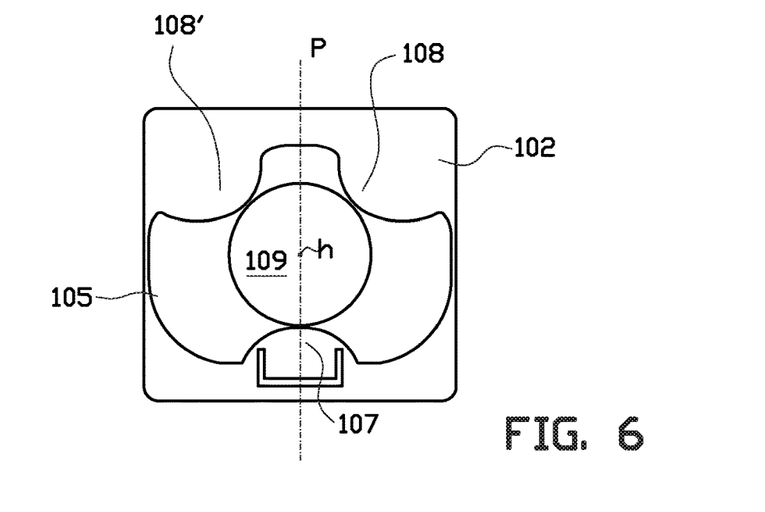
FIG. 6 shows a top view of the dispensing container of FIG. 3.

A grip 105 is provided on top of the container 2. In the example as shown in FIG. 3, the grip 105 is connected to or is a part of the cover 102 via a grip neck 106. The grip 105 is roughly shaped as a W as shown in the top view of FIG. 6. The shape comprises a bilateral symmetry in the sagittal plane, which is a plane is defined by the central axis h of the container 2 and a line of symmetry P of the grip 105. As shown in the top view of FIG. 6 the grip 105 comprises three recesses 107, 108, 108'. A first recess 107, arranged at a bottom of the W-shape, which recess 107 is dissected by the line of symmetry P, and two further recesses 108, 108', arranged at a top of the W-shape, which recesses 108, 108' are mirror symmetrically arranged with respect to the line of symmetry P and at a distance from the line of symmetry P. This allows the grip 105 to be seized manually, using three fingers, or by a robot arm 63 having three gripping fingers. This shape of the grip 105 provides a univocal orientation of the medical dispensing container 2 when seized by hand or by a robot arm 63; the container 2 can be picked up in only one way and can be positioned on a container position 31 on the holding device 3 in the correct orientation.

Figure 7:
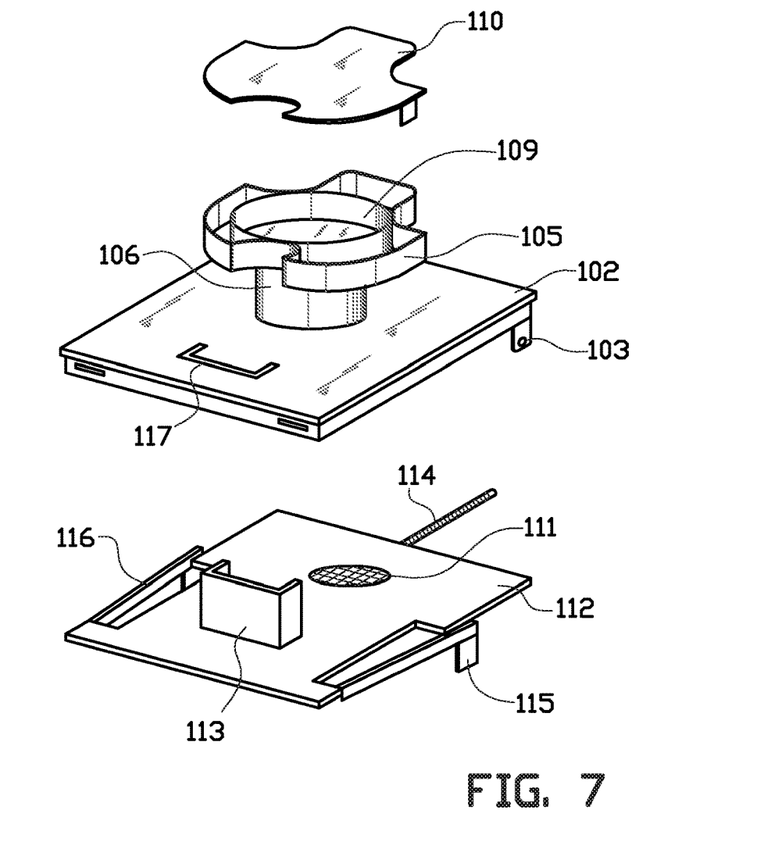
FIG. 7 shows an exploded view of a cover of the dispensing container.

As shown in FIG. 7, the grip 105 comprises a display chamber 109 for holding a sample of the solid medication with which the supply chamber 101 is filled, or is to be filled. Since the display chamber 109 is provided with a substantially transparent wall at a side facing the outside of the grip 105, the display chamber 109 and its content is visible from the outside of the container 2. In this example the grip 105 comprises a grip cover 110, which grip cover 110 is at least partially transparent at the part of the grip cover 110 that covers the display chamber 109. Thus the grip cover 110 comprises the transparent wall for closing off the display chamber 109. The at least partially transparent grip cover 110 can be removed from the grip 105, to place an example medication in the display chamber 109.

The cover 102 also comprises a chamber for containing a drying substance, which drying substance chamber is separated from the inside of the supply chamber 101 by a grid 111. The grid 111 is arranged in an opening of a cover locking plate 112 and provides a fluid communication between the drying substance chamber and the inside of the supply chamber 101. In this example, the drying substance chamber is arranged in the grip neck 106, which comprises a cavity that is open at a side facing the inside of the supply chamber 101. At least in the closed position of the cover 102, the grid 111 is arranged in front of said opening.

The cover locking plate 112 is arranged to lock the cover 102 in the closed position as shown in FIG. 3, and to prevent the cover 112 from opening when the medication dispensing container 2 is lifted. The lock can be opened when pressing a catch 113 towards the grip 105. The freedom of movement of the spring 114 loaded cover locking plate 112 is limited by two limiters 115, 116.

To gain access to the drying substance chamber, the two limiters 115, 116 are pressed. Subsequently the cover locking plate 112 is pushed further against the loaded spring 114, and is moved out of the cover 102 by pushing the catch 113 through a hole 117 in the cover 102.

Figure 4:
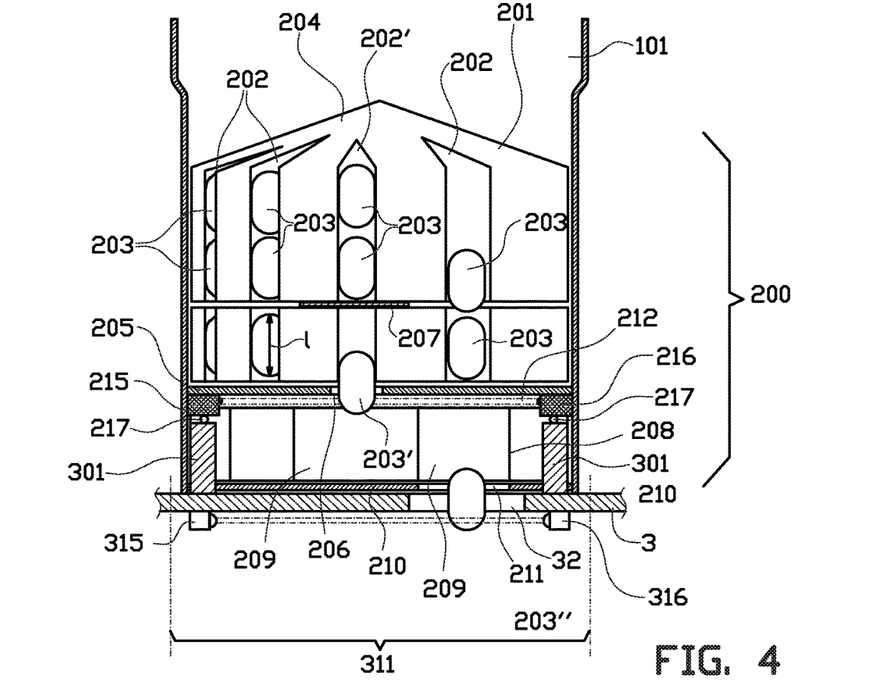
FIG. 4 shows a schematic cross section of the dispensing mechanism of the medication dispensing container of FIG. 3.

The medication dispensing container 2 comprises a dispensing mechanism 200. In this example the dispensing mechanism 200 is arranged below the supply chamber 101. As shown in FIGS. 3 and 4, the dispensing mechanism 200 comprises an arranging body 201 with a plurality of passageways 202, each of which is arranged for accommodating two ore more of said solid medication 203 in a single row.

The arranging body 201 comprises a conical top surface 204 for guiding the medication 203 in the supply chamber 101 towards the passageways 202 which are arranged at the circumference of the arranging body 201. In the embodiment shown in the FIGS. 3 and 4, the arranging body 201 comprises a central axis which substantially coincides with the central axis h of the container 2.

Below the arranging body 201, a first wall member 205 is arranged which first wall member 205 comprises an output opening 206. The first wall member is fixed inside the medication dispensing container, thus is stationary in the medication dispensing container, and the arranging body 201 is rotatable around this central axis in order to subsequently align one of said plurality of passageways 202 with said output opening 206.

Above the output opening 206 a separating member 207 is arranged, which separating member 207 comprises a plate or a brush which extends out into at least one of said passageways 202' which is aligned with the output opening 206. The distance between the separating member 207 and the first wall member 205 is substantially equal to the length 1 of a single solid medication 203 when arranged in said passageways 202, 202'.

When a first passageway 202' arrives above the output opening 206, a first solid medication 203' which is arranged adjacent to the first wall member 205 will drop through the output opening 206, whereas the solid medications 203 arranged above the first solid medication 203' are essentially held in their position by the separating member 207, as shown in FIG. 4. Thus only one solid medication 203' will fall through said output opening 206. Subsequently, the arranging body 201 is rotated to a position where the first passageway 202' is free from the separating member 207, and the solid medications 203 can now move downwards in the first passageway 202' to arrange a next solid medication adjacent to the first wall member 205.

Below said first wall member 205, a storage body 208 is arranged. Said storage body 208 comprises a plurality of waiting chambers 209. Each waiting chamber 209 is arranged for receiving and accommodating the solid medication 203' from one passageway 202', when said passageway 202', said output opening 206 and said waiting chamber 209. In the embodiment shown in the FIGS. 3 and 4, the storage body 208 comprises a central axis which substantially coincides with the central axis h of the container 2. In addition the storage body 208 is rotatable around this central axis in order to subsequently align one of said plurality of waiting chambers 209 with said output opening 206.

As schematically indicated in FIG. 3, the cross-sectional area A1 of the passageways 202 in a plane substantially parallel to the first wall member 205, is smaller then the cross-sectional area A2 of the waiting chambers 209.

Below the storage body 208, a second wall member 210 is arranged, which second wall member 210 is provided with an outlet opening 211, 211' for dispensing a medicament 203" out of the medication dispensing container 2. The second wall member 210 is fixed in the medication dispensing container 2, thus is stationary in the medication dispensing container, and the storage body 208 is rotatable with respect to the second wall member 210 in order to subsequently align one of said plurality of waiting chambers 209 with said outlet opening 211, 211'. As clearly shown in FIGS. 4 and 5, the outlet opening 211 is arranged out of alignment with the output opening 206. In particular, as shown in the cross-section of FIG. 4, the outlet opening 211 is shifted with respect to the output opening 206 over a distance such that a medicament 203' which falls in a waiting chamber 209 is detained inside said waiting chamber 209 and thus is not immediately dispensed out of the container 2. In order to dispense a medicament out of said waiting chamber 209, the storage body 208 must be rotated in order to align said waiting chamber 209 comprising said medicament with the outlet opening 211.

As schematically indicated in the example of FIG. 3, the outlet opening 211' is smaller than the cross-sectional area A2 of the waiting chambers 209.

Alternatively, in the example of FIG. 4, the outlet opening 211 is substantially of equal size with respect to the size of the waiting chambers 209, at least in a plane substantially parallel to the second wall member 210. Preferably the area of the outlet opening 211 is substantially congruent to the cross-sectional area A2 of the waiting chambers 209.

Figure 5A:
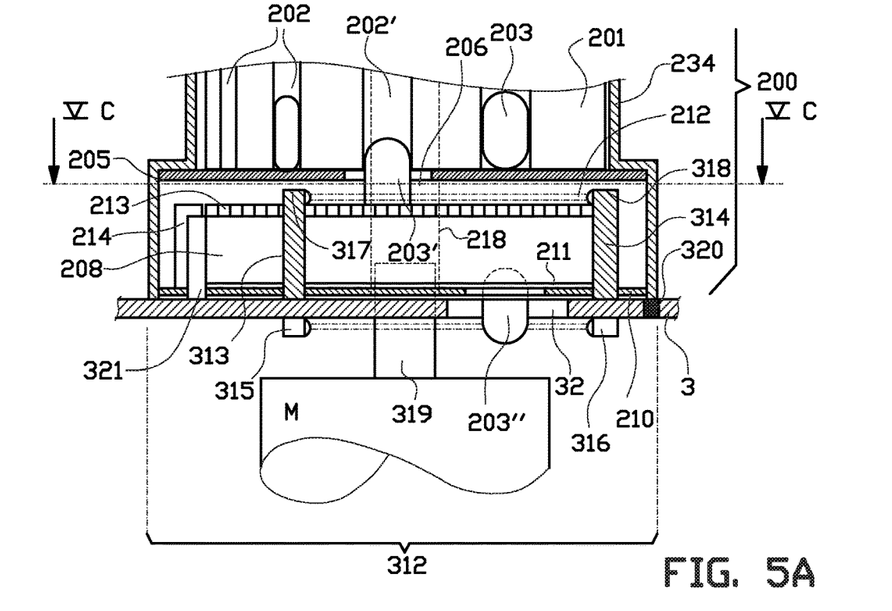
FIG. 5A shows a schematic view, partially in cross section, of a further example of a dispensing mechanism which is provided with a stop mechanism.
Figure 5B:
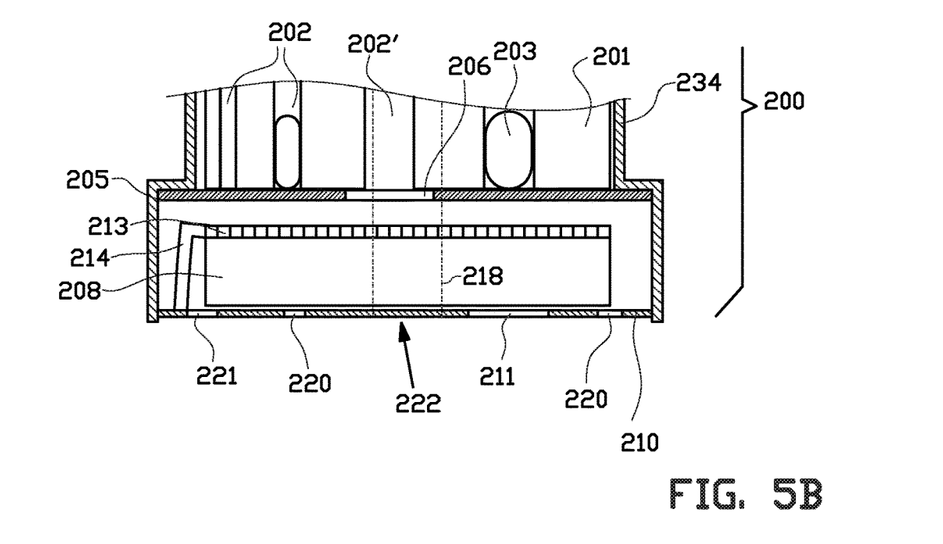
FIG. 5B shows the example of FIG. 5A when removed from a container position on the holding device.
Figure 5C:
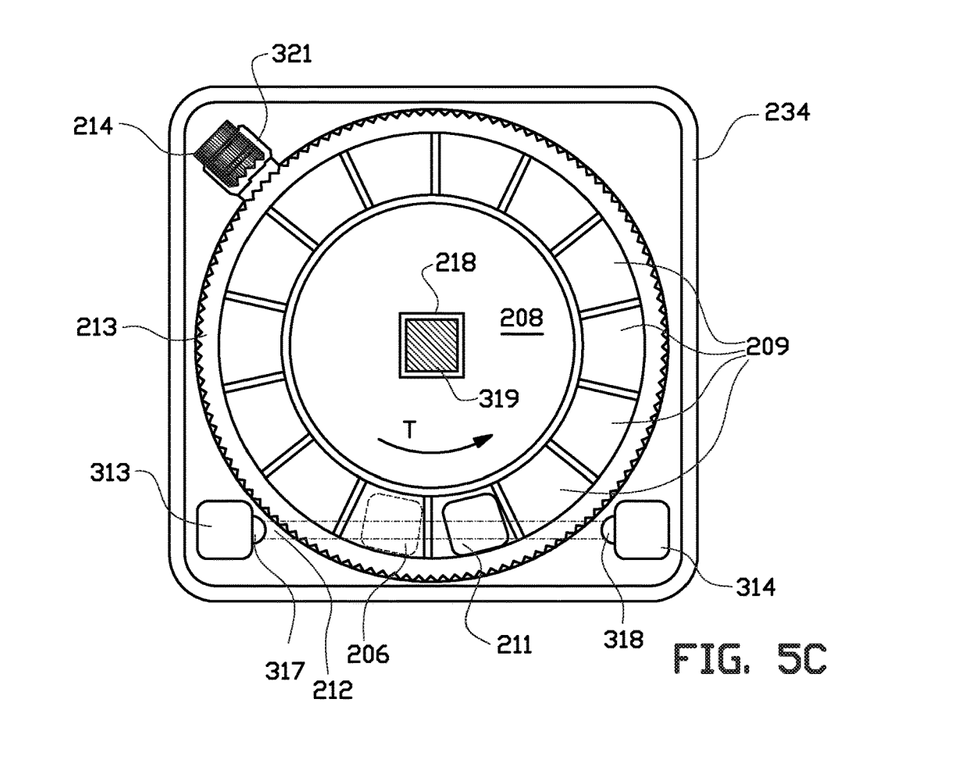
FIG. 5C shows a schematic cross section of the further example of FIG. 5A along the line C-C.

In the example as shown in FIGS. 4 and 5, the number of waiting chambers 209 in the storage body 208 is equal to the number of passageways 202 in the arranging body 201. Each one of said waiting chambers 209 is arranged in line and below a corresponding passageway 202. The storage body 208 is rotation-fixedly connected to the arranging body 201. When driving the storage body 208 to rotate, the arranging body 201 will rotate along with the storage body 208.

It is noted that in the example as shown in FIG. 3, the number of waiting chamber 209 in the storage body 208 is not equal to the number of passageways 202 in the arranging body 201. In this example it is preferred to drive a rotation of the storage body 208 and a rotation of the arranging body 201 separately.

As schematically shown in the partial cross section in FIGS. 5A and 5B and the cross section in FIG. 5C, the storage body 208 is provided with a stop ring 213, which stop ring 213 comprises a saw-tooth shaped surface which is arranged at the circumference of the storage body 208. In addition, a stop spring 214 is attached to the inside of the container, in particular to the second wall member 210. The stop spring 214 reaches towards the stop ring 213 and is biased towards the stop ring 213 to provide a coupling between the stop spring 214 and the stop ring 213, as schematically shown in FIG. 5B. In particular, the stop spring 214 comprises at least one tooth which is shaped and arranged to reach in a space in between two adjacent teeth of said saw-tooth shaped surface. The stop ring 213 and the stop spring 214 thus provide a stop mechanism for holding the storage body 208 in a substantially fixed position in the medication dispensing container 2.

The container, and in particular the second wall member 210 thereof, is provided with a de-activating opening 221 for positioning a de-activating member 321 into said container for unlocking and de-activating said stop mechanism. In particular, the de-activating member 321 is arranged on the container position 312 and reaches via the de-activating opening 221 inside the container to push the stop spring 214 away from the stop ring 213 in order to unlock said stop mechanism, as shown in FIG. 5A. Thus when the container is arranged on the container position 312 with the de-activating member 321, the stop mechanism is unlocked and the storage body can be driven to rotate. When the container is moved away from the container position 312 with the de-activating member 321, the stop spring 214 will flex toward the stop ring 213 and the stop mechanism is activated and will hold the storage body 208 in a fixed position in the medication dispensing container 2, as shown in FIG. 5B. Thus the stop mechanism prevents an inadvertent dispensing of medication from the container 2, for example while the medication dispensing container 2 is picked up and/or transported by a robot arm.

As shown in FIGS. 4 and 5, the medication dispensing container 2 comprises a detection arrangement for at least facilitating a detection whether or not one or more of said waiting chambers 209 are filled with the solid medication 203. This detection arrangement comprises a passage 212 for a light beam, which passage 212 crosses the output opening 206 and is arranged between the first wall member 205 and the storage body 208. The passage 212 provides an arrangement which facilitates and enables the detection whether or not a medication 203' has fallen through the output opening 206 into the waiting chamber 209 below, and thus whether or not the waiting chamber 209 below the output opening 206 is filled with a solid medication 203'.

In the embodiment as shown in FIG. 4, the medication dispensing container 2 comprise a light source 215 for emitting a light beam through said passage 212 and a light detector 216 to detect the light beam and thereby the passing of a medication 203' through said output opening 206 which temporarily blocks the light beam. This light source 215 and light detector 216 are provided with connectors 217 for connecting with positioning columns 301 which are arranged on the holding device 3, in particular at each container position 31. The medication dispensing container 2 is provided with two openings in the second wall member 210. When the medication dispensing container 2 is correctly placed at the container position 311, the position columns 301 reach through these openings into the medication dispensing container 2, as shown in FIG. 4, and connect to the connectors 217 of the light source 215 and the light detector 216. Via this connection, the system 1 as shown in FIGS. 1 and 2, in particular the holding device 3 thereof, can supply power to the light source 215 and connect the detector 216 to the control system 8.

In addition, the container position 311 comprises a further detection system comprising a second light source 315 for emitting a second light beam which crosses said through opening 32 and a light detector 316 to detect the second light beam and thereby the passing of a medication 203" through said through opening 32 at the container position 311, which passing medication 203" temporarily blocks the second light beam. As shown in FIG. 4, said further detection system is arranged at the holding device at a side facing away from the medication dispensing container 2. Again the holding device 3 can supply power to the second light source 315 and connect the second detector 316 to the control system 8.

In addition, the arranging body 201 and/or the storage body 208 of the example of FIG. 4 are provided with a driving motor (not shown) for driving the rotation of the arranging body 201 and the storage body 208 around their central axis. Again the holding device 3 can supply power to the driving motor and/or connect the driving motor to the control system 8 via the position columns 301.

In an alternative example, as shown in FIGS. 5A and 5B, the medication dispensing container 2 does not have any active components. The medication dispensing container 2 of this example does not comprise a light source or a detector. The actual light source 317 and detector 318 are arranged on position columns 313, 314 of the holding device 3, in particular at each container position 312. The medication dispensing container 2 is provided with two openings 220, also denoted detector openings, in the second wall member 210. When the medication dispensing container 2 is correctly placed at the container position 312, the position columns 313, 314 reach through these detector openings 220 into the medication dispensing container 2, as shown in FIGS. 5A and 5C, wherein the light source 317 of a first position column 313 aligns with the passage 212 and the detector 318 of a second position column 314 also aligns with the passage 212. Since the light source 317 and the light detector 318 are arranged on or in the position columns 313, 314, they are an integral part of the holding device 3. The supply of power to the light source 317 and connection of the detector 318 to the control system 8 is provided by the holding device 3.

In addition the container position 312 comprises a further detection system comprising a second light source 315 for emitting a second light beam which crosses said through opening 32 and a light detector 316 to detect the second light beam and thereby the passing of a medication 203" through said through opening 32 at the container position 312, which passing medication 203" temporarily blocks the second light beam. As shown in FIG. 5A, said further detection system is arranged at the holding device at a side facing away from the medication dispensing container 2. Again the holding device 3 can supply power to the second light source 315 and connect the second detector 316 to the control system 8.

In addition, the medication dispensing container 2 of the example of FIG. 5 does not comprise a driving motor. An external driving motor M for driving the rotation of the arranging body 201 and the storage body 208 around their central axis is arranged at the container position 312 and is an integral part of the holding device 3. The arranging body 201 and/or the storage body 207 are provided with a coupling member 218 which is arranged at a central opening 222 in the second wall member 210. The driving shaft 319 of the external driving motor M is arranged to reach through said central opening 222 in the second wall member 210 to provide a connection to the coupling member 218. In particular, said driving shaft 319 and said coupling member 218 are arranged to provide form closure, which form closure provides a substantially rotation fixed coupling between the driving shaft 319 of the external motor M and the coupling member 218 of the container 2. Again the holding device 3 can supply power to the external driving motor M and/or connect the external driving motor M to the control system 8.

Both the FIGS. 4, 5A, 5B and 5C show an example of a dispensing mechanism according to the invention. It is to be understood that the above description is included to illustrate some preferred embodiments and is not meant to limit the scope of the invention. It will be apparent to one skilled in the art that further embodiments can be constructed by using some of the features of the example as shown in FIG. 4 and some of the features of the example as shown in FIGS. 5A, 5B and 5C.

In both examples as shown in the FIGS. 4 and 5A, 5B and 5C, the dispensing mechanism generally works the same way: When the arranging body 201 is rotated with respect to the first wall member 205 and a passageway 202 arrives above the output opening 206, a first medication 203' in said passageway 202 adjacent to the first wall member 205 will drop into the waiting chamber 209. A second medication 203, arranged above the first medication 203', in said passageway 202 is blocked by the separating member 207, so that only the lower most medication 203' falls into the waiting chamber 209.

The falling first medication 203' traverses the passage 212 and is detected by the sensor arrangement 215, 216; 317, 318, and signals to the control system 8 that a medication 203' is in the waiting chamber 209. When the waiting chamber under the output opening 206 and adjacent to the outlet opening 211 is filled, the container is ready for immediately dispensing a medication when necessary.

The control system 8 thus holds information whether or not one or more of said waiting chambers 209 are filled with a medication. When the control system 8 does not receive such a signal, thus when no medication 203' falls into the waiting chamber 209, the arranging body 201 continues rotating until a waiting chamber 209 is filled. When the arranging body 201 has rotated at least one full turn without detecting that a medication 203' has fallen in a waiting chamber, the container 2 most probably is empty, and needs to be replaced and/or refilled.

When the correct collection tray 41 is underneath the outlet opening 211 of the container 2, the control system 8 controls the motor to drive the storage body 208 to rotate, for example in the direction T, to move a filled waiting chamber 209 in aligned with the outlet opening 211. The medication 203" will drop out of the waiting chamber 209 into said collection tray 41. The falling medication 203" is detected by the sensor arrangement 315, 316, and signals to the control system 8 that a medication 203" from this specific container 2 is in the collection tray 41. Rotation of the storage body 208 stops when the next filled waiting chamber is arranged adjacent to the outlet opening 211, in particular in rotation direction T upstream adjacent to the outlet opening 211.

Preferably the arranging body 201 and the storage body 208 are rotation fixedly coupled. Preferably the waiting chamber 209 which is in alignment with the outlet opening 211 is arranged in rotation direction downstream and adjacent to the waiting chamber 209 which is in alignment with the output opening 206. In this case, usually only one waiting chamber 209 is filled with medication 203', and when the storage body 208 together with the arranging body 201 are rotated for dispensing a medication 203" out of the outlet opening 211, the rotation of the storage body 208 stops when the next waiting chamber 209 is filled.

As described above, the medication dispensing containers 2 according to the invention can be used in a system 1 which accommodates a series of such medication dispensing containers 2, which system is arranged for selectively dispensing an amount of said solid medication from one or more dedication dispensing containers 2 and for packing said dispensed solid medication. In the system 1, as shown in FIGS. 1 and 2, the containers 2 are arranged on a substantially horizontal plane of the holding device 3 to minimize the drop height of the dispensed medication into the collection trays 41 of the collection frame 4. Every container 2 can dispense one type of medication and deliver one or more pills, tablets or capsules to a particular collection tray 41 when one of said containers 2 and/or the holding device 3 receives corresponding commands from the control unit 8. When one or more pills, tablets or capsules are dispensed from said container 2, this dispensing is detected by the feedback sensor arrangements 315, 316 which report the detection of the dispensing of one or more pills, tablets or capsules to the control unit 8.

Each one of the dispensing containers 2 can contain a large supply of identical pills, tablets or capsules; in short medicaments. Each one of these medicaments may have a specific weight and/or specific size and dimensions, which makes each one of the dispensing containers 2 specific to hold and discharge a specific medicament. Because different medicaments can have different dimensions, the dimensions of the passageways 202, the output opening 206, the waiting chambers 209 and/or the outlet opening 211 for a particular container 2 are adapted to the dimensions of the particular medicament. The specific dispensing containers 2 are provided with an identification code, preferably a machine readable identification code which is readable by a sensor in the device. By reading the identification code, for example when a specific dispensing container 2 is placed on the holding device 3 by the robotic arm 61, 62, the information of the location of the specific dispensing container 2 and the medicaments it contains is provided to the control system 8 for the device, which control system 8 stores this information in a memory.

The sensor is for example arranged in the gripper 63 of the robotic arm 61, 62. Alternatively or in addition one or more of the container positions 31 are provided with a sensor for acquiring the identification code. For example, a container 2 is equipped with an identifier chip (RFID for example) and each container position 31, 311, 312 with a chip reader.

The containers 2 are placed on the container positions 31, 311, 312 on the holding device 3 in a random positions with a fixed orientation. Due to the shape of the grip 105 on top of the containers 2, each container 2 can be picked up in only one way by hand or by the robot 6. Each container position 31, 311, 312 on the holding device 3 has an orientation known by the control system 8, thus the control system 8 can instruct the robot 6 to correctly place a container 2 on one of said container positions 31, 311, 312. The positioning columns 301, 313, 314 make sure that the container 2 always has the correct orientation.

As shown in FIG. 4, for example, the positioning columns 301 and interface connections 217 can be combined for containers 2 with active components. In a preferred system, as shown in FIGS. 5A and 5B for example, the containers 2 does not have active components and the sensors 317, 318 and external driving motors M are an integral part of the holding device 3.

In order to provide a status information of each container 2 to an operator, the container housing 1 is arranged with an optical wave guide which is arranged to guide the light from a light source 320 at the container positions 31, 311, 312 to the container cover 102. In an embodiment, the container housing 1 is at least partially made from a substantially transparent material, such as glass or plastic, suitable for guiding the light from the light source 320 to the container cover 102 as schematically shown in FIG. 5A. The container cover will diffuse the light so that this light is clearly visible by an operator. When the control system 8 has established that there is a problem with one of said containers 2, for example that it is empty, the control system 8 can activate the corresponding light source 320 and it is immediately apparent to the operator that there is a problem with one of the containers 2 and which container 2 causes a problem. Alternatively, the light source 320 may comprise a colored light source, and the color or the light diffused by the container cover 102 gives a visible indication of the status of the container 2.

Alternatively, or in addition, the container position 31 is provided with a surrounding wall 34 for bounding the container position 31. The surrounding wall may be provided with an optical wave guide which is arranged to guide the light from a light source 35 upwards to an edge 36 of said surrounding wall 34 which faces away from said container position 31. In an embodiment, the surrounding wall 34 is at least partially made from a substantially transparent material, such as glass or plastic, suitable for guiding the light from the light source 35 to the edge 36 as shown schematically in FIG. 3. At the edge 36 the light may be diffused to illuminate the container 2. When the control system 8 has established that there is a problem with one of said containers, for example that it is empty, the control system 8 can activate the corresponding light source 35 to illuminate said container 2 and it is immediately clear to the operator that there is a problem with one of the containers 2 and which container 2 causes the problem. Alternatively, the light source 35 may comprise a colored light source, and the color or the light illuminating said container 2 gives a visible indication of the status of the container 2.

In addition, containers 2, 21 for dispensing a medication from a group of similar medications can be provided with a cover 102 and/or a grip 105 with a similar or the same color, in order to more easily identify said group of similar medications. Different medication groups can be indicated by different colors of the grip and/or cover.

Figure 8:
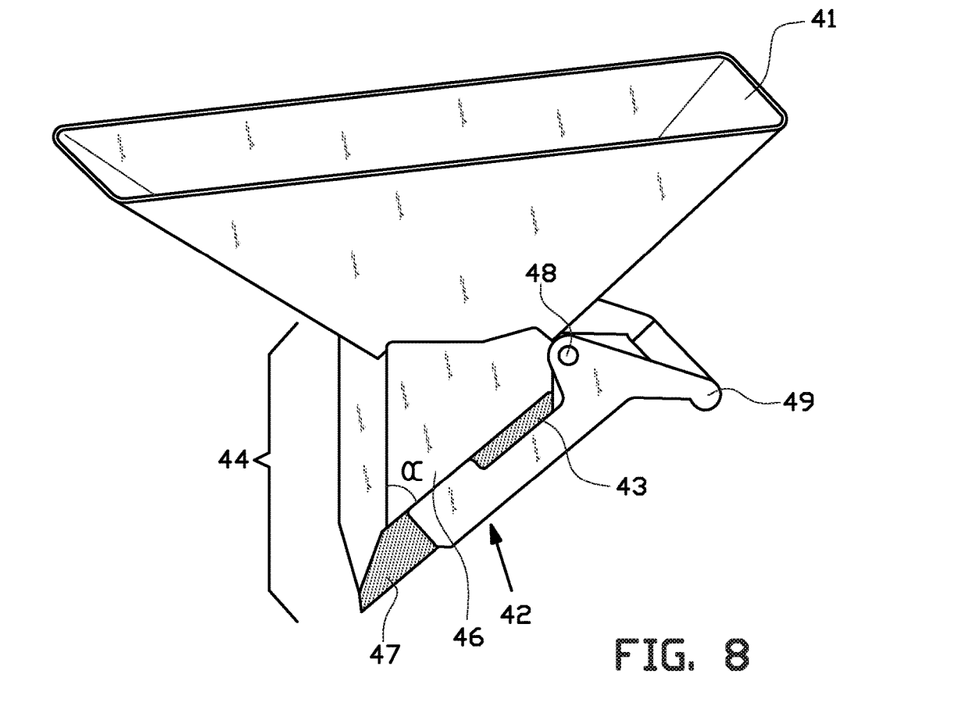
FIG. 8 shows a schematic view of an output of a collection tray of the system as shown in FIGS. 1 and 2.

As discussed above, the medications 203" from the containers 2, 21 are dropped into a collection tray or collection hopper 41. When the output opening 42 of the tray 41 aligns with the stationary position of the packing unit 5, a closing member 43 is moved to the second position which allows the solid medications in the tray 41 to move through the output opening 42 into the packing unit 5. In the embodiments of the collection tray 41 as shown in FIG. 8, the output opening 42 is provided with an improved release mechanism 44. Said release mechanism 44 comprises a collection tube 46 which is open towards the inside of the collection tray 41. The funnel shape of the collection tray 41 provides that the medications dispensed into said collection tray 41 slide into the collection tube 46. The closing member or shutter 43 forms a bottom wall of said collection tube 46. Preferably the shutter 43 is arranged at an acute angle α with respect to the collection tube 46, which preferably is arranged to extend in a substantially vertical direction.

The V-shape of the shutter and/or the collection tube 46, causes the medication(s) to accumulate at the shutter tip 47. The shutter 43 is hingedly connected to the collection tray 41 via a hinge 48. In addition the shutter is provided with an opening bar 49, which can be activated by the packing unit 5 for moving the shutter 43 and opening said output opening 42 of the collection tray 41. Since the medication(s) are accumulated at the shutter tip 47, the medication(s) will drop into the packing unit 5 as substantially one bundle or cluster of medication(s).

This release mechanism 44 is also capable of being activated at high speed in order to open the shutter 43 in a short time interval, which further facilitates that the medication(s) will drop into the packing unit 5 as substantially one bundle or cluster of medication(s). For example said time interval is less then 2 seconds, preferably less then 1 second.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

In summary, the present invention relates to a medication dispensing container for holding medications, which container is provided with a dispensing mechanism comprising:
an arranging body comprising passageways, each for accommodating a number of medications in a single row,
a first wall member with an output opening arranged below said arranging body, said arranging body is arranged to subsequently align one of said passageways with said output opening,
a separating member which blocks a passageway when aligned with the output opening,
a storage body comprising waiting chambers arranged below said first wall member, each waiting chamber is arranged for receiving the medication(s) from one passageway,
a second wall member with an outlet opening arranged below said storage body, said storage body is arranged to subsequently align one of said waiting chambers with said outlet opening, and
a detection arrangement for the detection whether or not one of said waiting chambers is filled.

The invention claimed is:

1. Medication dispensing container for holding solid medications, in particular pills, tablets or capsules, and which container is provided with a dispensing mechanism which is arranged for selectively dispensing an amount of said solid medications from an outlet opening at a bottom side of said container, wherein said dispensing mechanism comprises:
an arranging body comprising a plurality of passageways, wherein each passageway is arranged for accommodating one of said solid medications or two or more of said solid medications in a single row,
a first wall member arranged below said arranging body and provided with an output opening, wherein the first wall member and the arranging body are movable with respect to each other in order to subsequently align one of said plurality of passageways with said output opening,
a separating member which extends out into or over a passageway which is aligned with the output opening,
characterized in that said container further comprises a storage body arranged below said first wall member, said storage body comprising a plurality of waiting chambers, each waiting chamber is arranged for receiving the solid medication(s) from one passageway when said passageway, said output opening and said waiting chamber are in alignment, and for accommodating said solid medication(s),
a second wall member arranged below said storage body and provided with the outlet opening, wherein the second wall member and the storage body are movable with respect to each other in order to subsequently align one of said plurality of waiting chambers with said outlet opening, and
a detection arrangement for at least facilitating detecting whether or not one or more of said waiting chambers are filled with the solid medication(s).

2. Medication dispensing container according to claim 1, wherein the detection arrangement comprises a passage for a light beam, which passage crosses the output opening.

3. Medication dispensing container according to claim 2, wherein the container is provided with at least one detector opening which connects to the passage for positioning a light source and/or a detector in alignment with said passage.

4. Medication dispensing container according to claim 1, wherein the output opening is arranged out of alignment with the outlet opening.

5. Medication dispensing container according to claim 4, wherein the output opening is shifted with respect to the outlet opening over a distance equal to or larger than a size of a waiting chamber.

6. Medication dispensing container according to claim 4, wherein the first and second wall member are stationary arranged in said container.

7. Medication dispensing container according to claim 1, wherein the arranging body and the storage body are rotation-fixedly connected to each other.

8. Medication dispensing container according to claim 1, wherein the arranging body and/or the storage body are provided with a coupling member for coupling to an external driver for moving said arranging body and/or said storage body with respect to said container.

9. Medication dispensing container according to claim 1, wherein the cross-sectional area of one of said plurality of waiting chambers, at least in a plane parallel to the first wall member, is larger than the cross-sectional area of one of said passageways.

10. Medication dispensing container according to claim 1, wherein the cross-sectional area of one of said plurality of waiting chambers, at least in a plane parallel to the second wall member, and the outlet opening are congruent.

11. Medication dispensing container according to claim 1, wherein the container comprises a stop mechanism for holding the storage body in a fixed position in the container.

12. Medication dispensing container according to claim 11, wherein the stop mechanism comprises a stop ring and a stop spring.

13. Medication dispensing container according to claim 12, wherein the stop ring is fixedly arranged on the storage body, and wherein the stop spring is fixedly arranged on an inside part of the container.

14. Medication dispensing container according to claim 11, wherein the container is provided with at least one de-activating opening which connects to the stop mechanism for positioning a de-activating member into said container for de-activating said stop mechanism.

15. Medication dispensing container according to claim 1, wherein the container comprises a grip which is arranged at the top of the container, and which is shaped to seize and move the container manually on the one hand, and by robot on the other.

16. Medication dispensing container according to claim 15, wherein the shape of the grip comprises a bilateral symmetry in only one sagittal plane.

17. Medication dispensing container according to claim 15, wherein the container comprises a filling opening at the top of the container, and a cover for closing said filling opening, wherein the cover comprises said grip.

18. Medication dispensing container according to claim 15, wherein the container comprises with a chamber for containing a drying substance, which chamber is arranged in fluid communication with the inside of the container, and which chamber is arranged in said grip.

19. Medication dispensing container according to claim 15, wherein the container comprises a display chamber for holding an example of the solid medication, wherein the display chamber is provided with a transparent wall at a side facing the outside of the container, and which display chamber is arranged in said grip.

20. System which accommodates a series of medication dispensing containers according to claim 1, which system is arranged for selectively dispensing an amount of said solid medications from one or more medication dispensing containers and for packing said dispensed amount, said system comprising:
- a holding device provided with an array of container positions arranged adjacently in a plane, wherein the holding device at each of said array of container positions is provided with a holder for one of said medication dispensing containers and with a through opening for passing discharged solid medications there through,
- a collection frame arranged below the holding device, wherein the collection frame and the holding device are movable with respect to each other, wherein said collection frame is provided with a series of collection trays, said trays have an elongated shape with a longitudinal direction which extends parallel to said plane and over a length of at least two of said through openings, wherein said trays comprises a receiving opening at a side facing said holding device for capturing said discharged solid medications and each comprises an output,
- a packing unit arranged below the collection frame for collecting the captured solid medications from the output of a tray and packing said solid medications, and
- a controller for controlling the working of said system and the medication dispensing containers arranged on said holding device.

21. System according to claim 20, wherein at least one container position comprises one or more positioning projections, wherein the positioning projections provide a fixed orientation of a medical dispensing container when arranged at said at least one container position.

22. System according to claim 21, wherein said positioning projections comprises a position column which projects out of the plane of the holding device, in a direction perpendicular to said plane.

23. System according to claim 21, wherein the medical dispensing container comprises openings at the bottom side for accommodating said positioning projections, wherein the positioning projections and the openings provides a fixed orientation of a medical dispensing container when arranged at said at least one container position.

24. System according to claim 21, wherein one or more of said positioning projections comprises interface connections for connecting the controller to a medication dispensing container arranged on said positioning projections with interface connections.

25. System according to claim 21, wherein one or more of said positioning projections comprises a first light source and/or a first detector, wherein the first detector is connected to the controller, wherein the first light source and/or first detector are arranged for aligning with a detection arrangement in a medication dispensing container arranged on said positioning projection(s) with first light source and/or first detector.

26. System according to claim 21, wherein at least one of said positioning projections comprises a de-activating member, wherein the de-activating member is arranged for de-activating said stop mechanism in a medication dispensing container arranged on said positioning projection(s) with the de-activating member.

27. System according to claim 20, wherein at least one container position comprises a delivery detection arrangement for detecting the dispensing of a medication from a medical dispensing container arranged at said at least one container position.

28. System according to claim 27, wherein said delivery detection arrangement comprises a second light source for emitting a light beam which crosses the outlet opening the medical dispensing container arranged at said at least one container position, and a second detector arranged in the light beam path of the light beam, in particular at a position after the light beam has crossed the outlet opening at least once, wherein the second detector is connected to the controller.

29. System according to claim 20, wherein one or more of said container positions comprises a code reader for reading an identification code of a medication dispensing container arranged on said container position, wherein said code reader is connected to the controller.

30. System according to claim 20, wherein one or more of said container positions comprises an indicator light for illuminating a medication dispensing container arranged on said container position, wherein said indicator light is connected to the controller.

31. System according to claim 30, wherein one or more of said medication dispensing containers comprises a guiding arrangement for guiding light which originates form the indicator light towards the top side of the medical dispensing container.

32. System according to claim 20, wherein the output of a collection tray comprises a tube part comprising an output opening and a shutter wherein the shutter is movable between a closing position for closing said output opening and an opening position for opening said output opening, wherein said shutter in the closing position is arranged at a sharp angle with a horizontal plane.

33. Method for dispensing solid medications, in particular pills, tablets or capsules, from a container, which container is provided with a dispensing mechanism which is arranged for selectively dispensing an amount of said solid medications from an outlet opening at a bottom side of said container, wherein said dispensing mechanism comprises an arranging body, a first wall member and a separating member, and wherein the container comprises a storage body and a second wall member, wherein said method comprises the steps of:

accommodating one of said solid medications or more of said solid medications in a single row, in one of a plurality of passageways of the arranging body,     moving said arranging body with respect to the first wall member arranged below said arranging body and provided with an output opening, to align one of said plurality of passageways with said output opening, wherein the separating member which extends out into or over said one of said plurality of passageways blocks said one of said plurality of passageways above a lower most solid medication in said one of said plurality of passageways, wherein said lower most solid medication falls through said output opening into one of a plurality of waiting chambers of the storage body which is arranged below said first wall member, wherein a filling of said one of a plurality of waiting chambers is detected by the use of a detection arrangement for at least facilitating detecting whether or not one or more of said waiting chambers are filled with the solid medication(s),     moving said storage body with respect to the second wall member arranged below said storage body and provided with an outlet opening, to align one of said plurality of waiting chambers with said outlet opening, wherein the solid medication(s) in said one of said plurality of waiting chambers falls through said outlet opening and is dispensed out of the container.

34. Method according to claim 33, wherein said container is a medication dispensing container according to claim 1.

35. Method according to claim 33, wherein said method is performed in a system according to claim 20.

\* \* \* \* \*